Nov. 7, 1944.   L. P. ISSOGLIO ET AL   2,361,943
CONDUIT SUPPORTING AND BONDING BLOCK
Filed Jan. 23, 1942
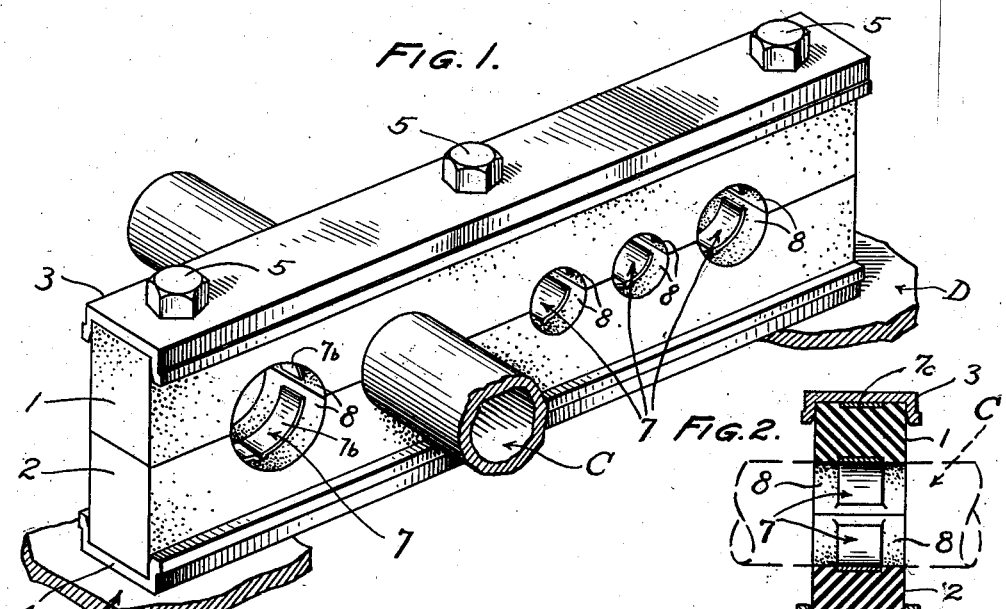
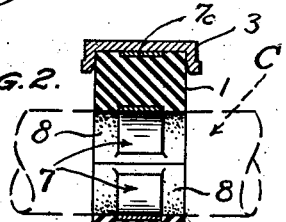
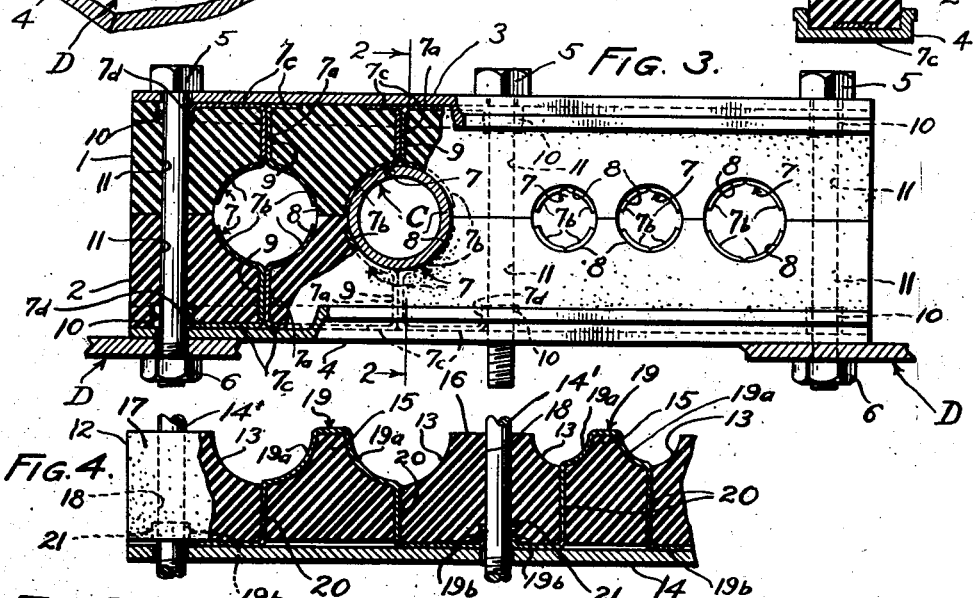
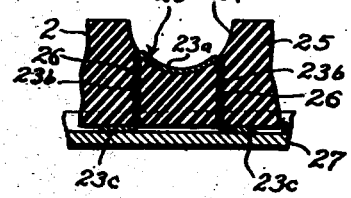
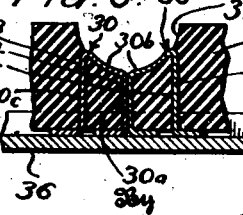
Inventors
Louis P. Issoglio and
Herman Ray Ellinwood
Attorney Patented Nov. 7, 1944

2,361,943

UNITED STATES PATENT OFFICE 2,361,943

CONDUIT SUPPORTING AND BONDING BLOCK

Louis P. Issoglio, Los Angeles, and Herman Ray Ellinwood, Burbank, Calif., assignors to Adel Precision Products Corp., Burbank, Calif., a corporation of California Application January 23, 1942, Serial No. 427,882

5 Claims. (Cl. 174—135)

This invention relates to supporting and bonding blocks for conduit and other lines in aircraft. A block of this type is disclosed in the United States Letters Patent No. 2,227,528 issued January 7, 1941, to Paul W. Adler and comprises a cushioned support of resilient insulation material for a group of metallic conduits and the like, with which support is combined a means for electrically bonding the conduit lines to a metallic structural part of the aircraft. The cushioned support dampens the vibrations of the conduit lines and prevents undue wear and abrasion, derangement and other line failures which might be caused by vibration, whereas the bonding means harmlessly discharges into the metallic structure of the aircraft whatever static electricity generated in the conduit lines.

The present invention relates more particularly to the construction of the bonding means and the manner of combining such means with the cushioned support and its associated elements to make possible a ready mounting and retention of the bonding elements in proper position without damage and derangement thereof and also prevent such exposure of said elements to liquids and fluids as would cause oxydizing, corrosion or electrolytic attack or other failure.

One of the objects of this invention is to provide a conduit supporting block of the character described wherein an electrically conductive bonding strip is combined with and held on the cushioned support without requiring that the clamping bolts or other fastenings pass through openings in the strip or strip carried parts or the use of extraneous fastenings therefor whereby such strips, which are necessarily of thin fragile metal, will not be weakened, mutilated, or deranged and likely to fail as a bonding medium.

A further object of my invention is to provide a conduit supporting means such as described wherein the bonding strip is incorporated with a cushion of resilient insulation material by being threaded or reeved therethrough and are held in place and protected against damage without the use of fastening elements.

Yet another object is to provide a conduit supporting block of the character described wherein the bonding strip is directly contacted with the rigid metallic backing means, or directly contacted with the clamping bolts or with both, to insure an effective bonding action between the conduits and the metallic structural parts of the aircraft on which the block is mounted.

A further object is to provide in a conduit supporting block such as described a construction and arrangement of the bonding elements which protects them against damage or derangement in fitting the block on the conduits or vice versa and in the handling, shipping or storing of the block.

With the foregoing objects in view, together with such other objects and advantages as may subsequently appear, the invention is carried into effect as illustrated by way of example in the accompanying drawing, in which:

Fig. 1 is a perspective view of a conduit supporting block embodying the present invention as when in use;

Fig. 2 is a sectional view taken on the line 2—2 of Fig. 3 showing the cushions under compression;

Fig. 3 is a fragmentary elevational and part sectional view of the block shown in Figs. 1 and 2 as when the cushions are under compression;

Fig. 4 is a fragmentary sectional and part elevational view of a modified form of the invention, the cushion not being under compression;

Fig. 5 is a fragmentary sectional view of another modified form of the invention, the cushion not being compressed;

Fig. 6 is a fragmentary sectional view of a further modified form of the invention, the cushion not being compressed.

Referring to the drawing more specifically, and particularly to Figs. 1, 2 and 3, it is seen that one form of block embodying our invention includes opposed elongated rectangular cushions 1 and 2 of resilient insulation material, channeled rigid metal backing members 3 and 4, embracing the outer longitudinal edges of the cushions, bolts 5 and nuts 6 for clamping the cushions upon the metal conduits such as the one C here shown, and securing the block to a metal structural part D of an airplane, and pairs of electrically conductive bonding strips 7 arranged in a particular manner to contact and electrically bond together the conduits, backing members and bolts.

The opposed faces of the cushions 1 and 2 are formed with transverse complementary conduit receiving grooves or channels 8 and as here shown the pairs of bonding strips 7 are associated with said channels so as to directly contact the conduits therein.

Under the provisions hereof the pairs of bonding strips are extended through slots or openings 9 which lead from the channels through the outer longitudinal faces of the cushions. Each bonding strip is of thin flexible metal and includes a straight body portion 7a lying in its slot 9, a curved inner end portion 7b extending part-way around a part of its associated channel for contact with a conduit, and a portion 7c which lies between its associated cushion and backing strip in contact with the latter.

One of the bonding strips 7 of each pair has its outer end 7d extended into a counterbore 10 of a bolt hole 11 in the associated cushion. When the cushions are clamped on the conduits and placed under compression the ends 7d of the certain bonding strips so provided are forced by the expansion of the cushion material into contact with the bolts as shown in Fig. 3 but when the cushions are not under compression these ends lie in the counterbores out of the way of the bolts so that they will not be engaged and mutilated or deranged when inserting the bolts. Thus it is seen that one strip 7 of each pair is directly contacted with a clamping bolt and both strips of each pair are contacted directly with a metallic backing member and a conduit.

The two body portions 7a of each pair of bonding strips 7 lie in close contact with one another in the slots or openings 9 whereas the two inner end portions 7b extend in opposite directions to overlie the semi-circular wall of the channel portion of the associated cushion. The inner ends 7b terminate short of the abutting faces of the two cushions and are thus protected from damage or derangement.

The bonding strips 7 are comparatively narrow and lie midway between the sides of the cushions so as to be enclosed and protected thereby. When the cushions are under compression the bonding strip portions which contact the conduits and the backing strips are pressed into the material of said cushion and lie flush with the contiguous faces of the cushion. This arrangement assists in the holding of the strips against derangement and distortion and insures effective bonding contact with the backing members and conduits. While the two cushions are shown as identically equipped with bonding elements we wish it to be understood that said elements may be omitted from one cushion as within the scope of the present invention, the two bonding units obviously affording greater assurance of a reliable bonding than one bonding unit.

A modified form of the invention hereof is shown in Fig. 4 wherein one or both of the cushions such as the one 12 here shown has the same transverse conduit receiving grooves 13 or channels as shown in Figs. 1, 2, and 3, also a metal backing member 14 and is adapted to be clamped by bolts 14' as hereinbefore described. Between the grooves or channels 13 are ridges or humps 15 and 16 whereas at the ends of the cushion or similar ridges 17, the ridges 16 and 17, are perforated by the holes 18 through which the bolts extend, whereas the ridges 15 are imperforate. In this form separate metallic bonding strips 19 straddle the imperforate ridges 15 and have portions 19a which extend part-way around the channels then through openings 20 to the outer faces or edges of the cushion where the end portions thereof are extended laterally to lie between the cushion and its associated metal backing member 14 and have deflected, laterally directed extremities 19b which engage the bolts in a flatwise manner, thus bonding them efficiently to said bolts. The conduits will directly contact the portions 19a of the strips and as other portions of the strips contact the backing member 14, the conduits will be bonded to the metallic structure on which the block is mounted. This form provides a cushioned protection for the "embedded" ends of the bonding strip and assures a good bonding effect. If desired the free ends of the strips may be extended into counterbores 21 of the bolt holes in the same manner as shown in Fig. 3 to directly contact the strips with the bolts.

It is seen that this form of our invention does not require the penetration of the bonding strips by the bolts or the use of extraneous fastening elements or terminal members on the strips, yet the strips are securely anchored and protected against damage or derangement due to the manner of mounting them on and in the cushions and the clamping of the ends thereof between the backing member and cushion. This arrangement also prevents exposure of the bonding strips and provides for an effective "sealing" thereof to prevent corrosion or other attack or failure which may result from exposure of the strips.

Another modified form of this invention as shown in Fig. 5 consists in mounting a metallic bonding strip 23 in each channel 24 of the cushion 25 so that an arcuate conduit engaging portion 23a of the strip lines the channel, straight portions 25b of the strip are threaded through openings 26 in the cushion and terminal portions 23c are extended laterally to lie between the cushion and the metal backing member 27 to bond the conduits to said member. This arrangement of the bonding strips provides rugged individual strips for the several conduits supported between the cushions, with said strips securely anchored to the cushions and effectively protected thereby against damage or derangement in the same manner as provided in the forms hereinbefore described. No extraneous fastenings nor penetration of the strips by the bolts are required to maintain the bonding strips in place in this form of our invention.

Referring to Fig. 6, another modified form of our invention is seen to include a pair of metallic bonding strips 30 for each conduit receiving channel 31 in the cushions 32. This arrangement is similar to that shown in Fig. 5 except that three holes or slots 33, 34 and 35 are provided in the cushion and the two strips each of the "staple" shape taken by the strip shown in Fig. 5 are extended through said openings. The center opening 34 receives parallel abutting leg portions 30a of the strips, while arcuate conduit engaging portions 30b of the strips are contiguous and form an arcuate bonding seat within the associated channel 31, and the other leg portions 30c are extended through the openings 33 and 35 respectively. The ends of the strips are extended in opposite directions to lie against and between the cushion and the metal backing member 36. This arrangement provides two bonding strips for each conduit receiving channel to assure a good bond and also protects the bonding strips against exposure and damage in the same manner as provided in the arrangement shown in Fig. 5.

The bonding strips of the types here shown may be made comparatively narrow as they do not require bolt openings therein and this provides a greater fully cushioned area in the channels than would be possible with the wider bonding strips as heretofore used.

We claim:

1. In a supporting and bonding block for conduits, a cushion of elastic insulation material having a plurality of conduit receiving channels extending across one face thereof, means for clamping said cushion against conduits lying in said channels including a rigid metal backing member on the face of the cushion opposite the channeled face thereof, and a metal bolt extending through said backing member and cushion, and an electrically conductive bonding strip extending through the cushion and having a portion disposed in one of the channels for contact with a conduit therein, and an end portion disposed between the cushion and the backing member, said end portion having a deflected extremity in flatwise contact with said bolt, said cushion having a counterbore through which said bolt passes, deflected extremity of said bonding strip being extended into said counterbore and held by the expanding material of the cushion in flatwise contact with the said bolt when the cushion is compressed by said clamping means, the aforesaid end portion of said bonding strip consisting only of a straight run extending along the surface of one of the sides of said cushion and said deflected extremity thereof.

2. In a conduit supporting block, a cushion block of compressible material having conduit receiving channels extending across one face thereof, means for clamping said block on the conduits in said channels including a metallic backing member on the face of said block opposite the channeled face thereof and bolts extending through said member, and electrically conductive bonding strips extending through the block from each channel to the face of the block against which the backing member is disposed, and having arcuate portions in the channels for contact with the conduits and end portions consisting of runs clamped between and against the block and said metal backing members and deflected extremities for said runs engaging said bolts in a flatwise manner.

3. In a conduit supporting structure, a pair of cushion blocks of compressible material each having conduit receiving grooves extending across one face thereof, means for clamping said blocks on conduits in said grooves including rigid metallic members engaged with the outer sides of said blocks and bolts extending through said blocks and metallic members, a flexible metallic bonding strip having an intermediate portion extending along the grooved face of the cushion between grooves therein, arcuate portions extending into and lining parts of grooves next adjacent said intermediate portion, and at least one end portion passing laterally through the cushion to a point opposite a said groove thereof and thence along the side of the cushion to a contacting relation with one of said bolts.

4. In a conduit supporting structure, a pair of cushion blocks of compressible material each having conduit receiving grooves extending across one face thereof, means for clamping said blocks on conduits in said grooves including rigid metallic members engaged with the outer sides of said blocks and bolts extending through said blocks and metallic members, a flexible metallic bonding strip passing laterally through at least one of said blocks from a grooved surface thereof to its outer side and thence passing between said block and an aforesaid rigid metallic member to a contacting relation to one of said bolts.

5. In a conduit supporting means, a pair of opposed blocks of elastic cushioning material, said blocks each having an inner and an outer face and having a series of conduit-receiving channels along its inner face in an opposed, complementary relation to the series of the other block, a metallic backing member extending along the outer face of each of said blocks, bolts extending through said backing members and blocks to clamp the latter against a conduit occupying said channels, an opening extending from one of said conduit-receiving channels of the aforesaid series through one of said blocks to an outer side thereof, and a metallic bonding strip having a portion intermediate its end portions which occupies said opening, one end portion of said bonding strip being extended along the inner face of one of said backing members and thence continued as a deflected extremity contacting said bolt in a flatwise manner, and the opposite end of said bonding strip being deflected for a bonding engagement with a conduit occupying one of said channels, the latter end portion of said bonding strip terminating short of the meeting line of the two abutting blocks.

LOUIS P. ISSOGLIO.
HERMAN RAY ELLINWOOD.